US012732685B2

(12) United States Patent
Holl et al.

(10) Patent No.: US 12,732,685 B2
(45) Date of Patent: Sep. 8, 2026

(54) MULTICAMERA COLLABORATIVE COMMUNICATION SESSION SYSTEM FOR DYNAMIC DETECTION AND AUGMENTATION OF VISUAL AID DISPLAY

(71) Applicant: Cisco Technology, Inc., San Jose, CA (US)

(72) Inventors: Steven Michael Holl, Sarasota, FL (US); Jason A. Kuhne, Hopkinton, MA (US); Jason Michael Coleman, Hendersonville, NC (US); Gonzalo A. Salgueiro, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 315 days.

(21) Appl. No.: 18/361,268

(22) Filed: Jul. 28, 2023

(65) Prior Publication Data

US 2025/0039532 A1 Jan. 30, 2025

(51) Int. Cl.

*H04N 23/61* (2023.01)
*G06V 20/40* (2022.01)
*G06V 40/20* (2022.01)
*G10L 17/02* (2013.01)
*G10L 25/57* (2013.01)

(Continued)

(52) U.S. Cl.

CPC ............. *H04N 23/61* (2023.01); *G06V 20/41* (2022.01); *G06V 40/20* (2022.01); *G10L 17/02* (2013.01); *G10L 25/57* (2013.01); *H04N 5/272* (2013.01); *H04N 23/661* (2023.01)

(58) Field of Classification Search

CPC ...... H04N 23/61; H04N 5/272; H04N 23/661; G06V 20/41; G06V 40/20; G10L 17/02; G10L 25/57; G10L 15/26

See application file for complete search history.

(56) References Cited

U.S. PATENT DOCUMENTS

| | | | |
|---|---|---|---|
| 10,062,384 | B1 | 8/2018 | Sugiura et al. |
| 10,582,117 | B1 | 3/2020 | Tanaka et al. |

(Continued)

FOREIGN PATENT DOCUMENTS

| | | | |
|---|---|---|---|
| WO | 2021226821 | A1 | 11/2021 |

OTHER PUBLICATIONS

Stack Overflow, "Object detection for a post-it note," Stack Overflow Questions, Feb. 13, 2014, https://stackoverflow.com/questions/21754866/object-detection-for-a-post-it-note.

(Continued)

*Primary Examiner* — Phung-Hoang J Nguyen

(74) *Attorney, Agent, or Firm* — Edell, Shapiro & Finnan, LLC

(57) ABSTRACT

In some aspects, the techniques described herein relate to a method including: controlling, during a collaborative communication session, a first camera of a collaborative communication session endpoint system to provide room scanning of a room in which the collaborative communication session endpoint system is arranged; controlling a second camera of the collaborative communication session endpoint system to image an active speaker participant in the collaborative communication session; and controlling a third camera of the collaborative communication session endpoint system to image a physical visual aid associated with the active speaker participant.

20 Claims, 9 Drawing Sheets

(51) Int. Cl.
*H04N 5/272* (2006.01)
*H04N 23/661* (2023.01)

(56) References Cited

U.S. PATENT DOCUMENTS

| | | | | |
|---|---|---|---|---|
| 2010/0123907 | A1* | 5/2010 | Edgar | H04N 1/3876 358/1.5 |
| 2011/0285809 | A1* | 11/2011 | Feng | G10L 25/78 348/E7.083 |
| 2015/0009278 | A1 | 1/2015 | Modai et al. | |
| 2017/0169827 | A1* | 6/2017 | Barreira Avegliano | H04N 21/4394 |
| 2022/0046186 | A1 | 2/2022 | Fayad et al. | |
| 2023/0029764 | A1* | 2/2023 | Lum | G06V 40/16 |
| 2023/0086248 | A1* | 3/2023 | Puyol | G06F 9/451 715/848 |
| 2023/0177855 | A1* | 6/2023 | Singh | G06V 20/62 382/176 |
| 2024/0232686 | A1* | 7/2024 | Fan | G06N 3/0985 |

OTHER PUBLICATIONS

Chrome Web Store, "Sticky Notes," Nov. 22, 2021, https://chrome.google.com/webstore/detail/sticky-notes/nbjdhgkkhefpifbifjiflpaajchdkhpg?hl=en.

Ideaflip, "Online Sticky Notes," retrieved Jul. 25, 2023, https://ideaflip.com.

Miro, "Online Sticky Notes for Virtual Collaboration," retrieved Jul. 25, 2023, https://miro.com/online-sticky-notes/.

* cited by examiner

FIG.5
505
My Great Idea #4
Lorem ipsum dolor sit amet, consectetur adipiscing elit, sed do eiusmod tempor incididunt ut labore et dolore magna aliqua.
510

MULTICAMERA COLLABORATIVE COMMUNICATION SESSION SYSTEM FOR DYNAMIC DETECTION AND AUGMENTATION OF VISUAL AID DISPLAY

TECHNICAL FIELD

The present disclosure relates to collaborative communication sessions, such as video conferences or virtual meetings.

BACKGROUND

Visual aids, and sticky notes in particular, are commonly used in many types of collaborative sessions and/or segments of collaborative sessions. For example, such visual aids are very common in collaborative sessions that include empathy mapping sessions, design thinking sessions, SWOT (strengths, weaknesses, opportunities, and threats) analysis, Kanban activities sessions, sprint planning sessions, Agile retrospective ceremonies, fishbone diagram creation sessions, and organizational chart creation sessions.

During in-person interactions in a video conferencing room as part of a collaborative communication session, a person may perform interactions that are difficult for others (especially remote users in hybrid collaboration communication session scenarios) to discern with a one camera system. Specifically, the creation and placement of visual aids, such as sticky notes, on a wall in a room are often challenging for a remote audience to view as they are being created, replaced, moved, or referred to by others in the room.

DETAILED DESCRIPTION

Overview

Figure 1:
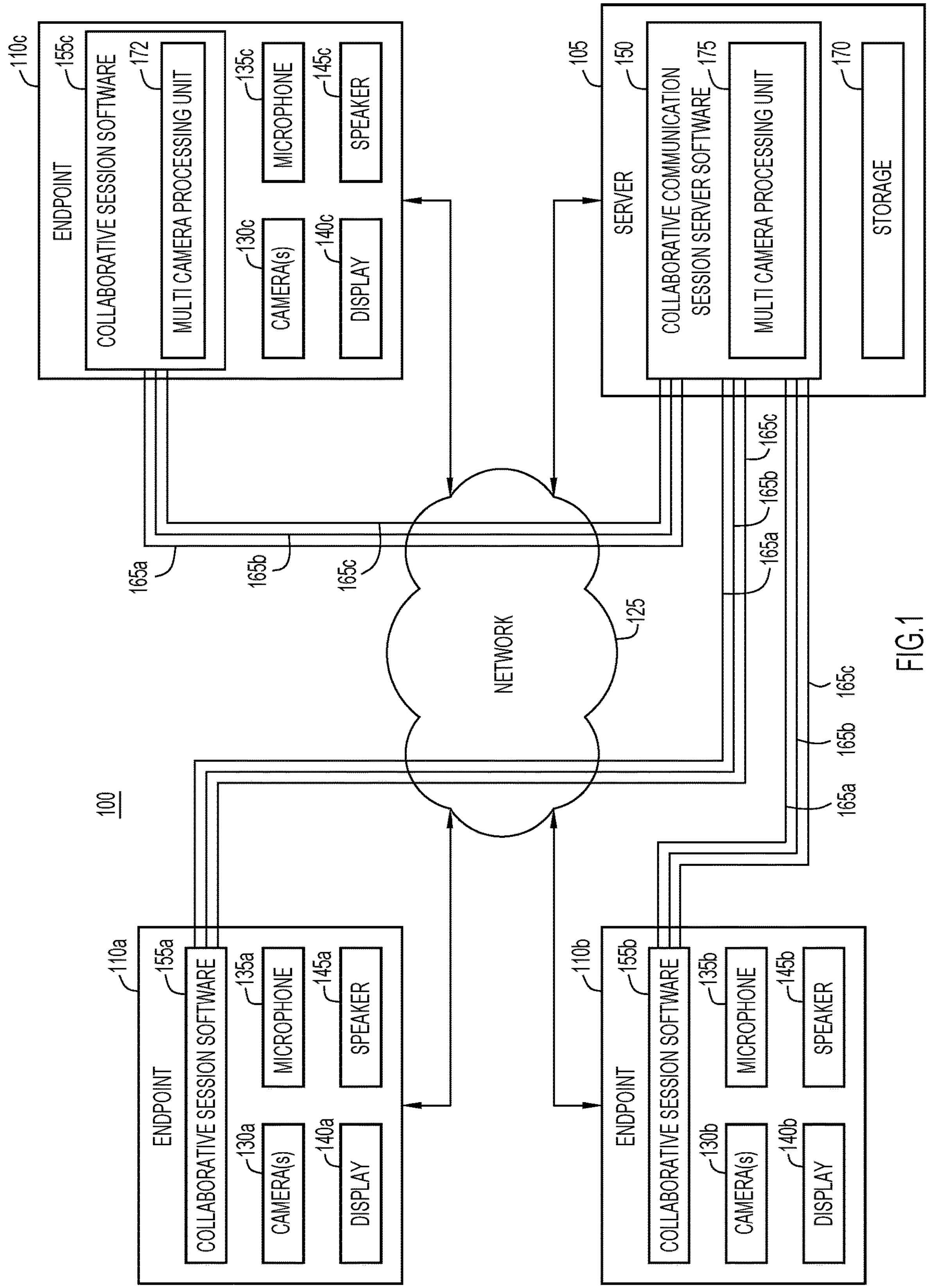
FIG. 1 is a system diagram of a collaborative communication session system configured to implement the multi-camera visual aid display techniques disclosed herein, according to an example embodiment.

In some aspects, the techniques described herein relate to a method including: controlling, during a collaborative communication session, a first camera of a collaborative communication session endpoint system to provide room scanning of a room in which the collaborative communication session endpoint system is arranged; controlling a second camera of the collaborative communication session endpoint system to image an active speaker participant in the collaborative communication session; and controlling a third camera of the collaborative communication session endpoint system to image a physical visual aid associated with the active speaker participant.

In some aspects, the techniques described herein relate to a method including: receiving a plurality of video streams for a collaborative communication session associated with one or more collaborative communication session endpoint systems; selecting a first video stream of the plurality of video streams including video of an active speaker participant in the collaborative communication session; selecting a second video stream of the plurality of video streams including video of a visual aid that includes visual aid content associated with the active speaker participant; and providing the first video stream and the second video stream to the one or more collaborative communication session endpoint systems for concurrent display of the first video stream and the second video stream at the one or more collaborative communication session endpoint systems.

In some aspects, the techniques described herein relate to an apparatus including: a plurality of cameras of a collaborative communication session endpoint system, a network interface configured to communicate over a network; and one or more processors configured to perform operations including: controlling, during a collaborative communication session, a first camera of the plurality of cameras to provide room scanning of a room in which the collaborative communication session endpoint system is arranged; controlling a second camera of the plurality of cameras to image an active speaker participant in the collaborative communication session; and controlling a third camera of the plurality of cameras to image a physical visual aid associated with the active speaker participant.

Example Embodiments

Visuals aids, such as sticky notes on whiteboards, are an effective planning tool (e.g., when used in design thinking sessions, agile planning meetings, etc.), but in hybrid collaborative communication sessions (i.e., collaborative communication sessions that include in-person and remote participants) it is challenging for remote participants to follow along with visual aid interactions, such as sticky note creation, placement, and movement as well as interactions in which in-person participants discuss, point to, or gesture to sticky notes. The techniques disclosed herein may use multicamera collaborative communication session endpoint systems that present visual aid content to remote participants that allow the remote participants to better understand the in-person participant interactions with the visual aids.

The systems according to the disclosed techniques are multicamera system that provide for the detection of interesting visual aid content and display the content via picture-in-picture (or side-panel video) overlays. The aim of these systems is to allow for delivery of both an active speaker participant's video content and the associated visual aid content to remote participants in an effective way.

With reference first made to FIG. 1, shown is an example hybrid collaborative communication session system 100 configured to implement the disclosed techniques. System 100 includes collaborative communication session server 105 and collaborative communication session endpoint systems 110*a*, 110*b*, 110*c* (110*a*-110*c*). Endpoint system 110*a* may be embodied as a suitable fixed device (e.g., a desktop computing device, a laptop computing device connected to external input/output devices, a video conference endpoint system, etc.) while endpoint system 110*b* may be a suitable mobile device (e.g., smartphone, laptop, tablet, etc.). Endpoint system 110*c*, on the other hand, may be a system or device used within an environment shared by a number of users who are physically within the same location, such as a video conference session endpoint arranged within a conference room. All of endpoint systems 110*a*-110*c* may be capable of communicating over network 125. Network 125 may be any suitable network to enable various components of system 100 to communicate with each other, such as the Internet.

Endpoint systems 110*a*-110*c* may enable respective participants to participate in an online collaborative communication session (e.g., a video teleconference). To that end, endpoint systems 110*a*-110*c* respectively include cameras 130*a*, 130*b* and 130*c* (130*a*-130*c*), microphones 135*a*. 135*b* and 135*c* (135*a*-135*c*), displays 140*a*, 140*b* and 140*c* (140*a*-140*c*), speakers 145*a*, 145*b* and 145*c* (145*a*-145*c*), and collaborative session software 155*a*, 155*b* and 155*c* (155*a*-155*c*). According to one or more specific example embodiments, one or more of the cameras 130*a*-130*c*, microphones 135*a*-135*c*, displays 140*a*-140*c*, and speakers 145*a*-145*c* may be incorporated into virtual reality/augmented reality (VR/AR) headsets or other VR/AR devices.

In one example, server 105 may facilitate, via collaborative session server software 150, the distribution of a plurality of media streams 165*a*, 165*b* and 165*c* (165*a*-165*c*) (e.g., audio streams, video streams, application data streams, chat data streams, screen sharing data streams, etc.). For example, the cameras 130*a*-130*c* associated with endpoints 110*a*-110*c*, respectively, may capture video, which collaborative session software 155*a*-155*c* transmits to server 105, respectively. Collaborative session server software 150 then redistributes the video to endpoint systems 110*a*-110*c* as media stream 165*a*. The video may then be displayed on displays 140*a*-140*c*. Similarly, microphones 135*a*-135*c* may capture audio (e.g., audio of active speaker participants collocated with endpoint systems 110*a*-100*c*), which collaborative session software 155*a*-155*c* transmits to server 105, respectively. Collaborative session server software 150 then distributes the audio to endpoint systems 110*a*-110*c* as media stream 165*b*. The audio may then be replayed via speakers 145*a*-145*c*. Similarly, collaborative session software 155*a*-155*c* may capture application data executing on endpoint systems 110*a*-110*c*, such as a shared document, and transmit this data to server 105, respectively. Collaborative session server software 150 then redistributes the application data to endpoint systems 110*a-c* as media stream 165*c*. The application data may then be displayed by collaborative session software 155*a*-155*c* on displays 140*a*-140*c*.

During a hybrid collaborative communication session, a user may place a visual aid (e.g., a sticky note) in a physical room in which one of endpoint systems 110*a*-110*c* is located. The cameras 130*a*-130*c* may capture the visual aids used in the physical locations, and provide the visual data associated with the visual aids to server 105. The collaborative session server software 150 may analyze the video provided by the cameras 130*a*-130*c* to digitize the visual aid. The digitalization of the visual aids may include extraction of the content included in the visual aids, which is stored in storage 170. Camera vision (also referred to as "machine vision") may be used to detect the content of a visual aid, handwriting analysis may be applied to extract the content, and natural language processing (NLP) word clustering may be used to categorize the content. The structured content stored in storage 170 may be used to incorporate the content of the visual aids or digitized versions of the visual aids into the collaborative communication session.

For example, speech-to-text transcriptions of the video conference audio feed may be used in conjunction with the digitized visual aid content. If a speaker mentions a topic that matches a topic detected from the handwriting analysis of a visual aid, the endpoint system 110*a*-110*c* collocated with the visual aid may highlight the visual aid that is being actively talked about by zooming in on the visual aid.

The above-described visual aid techniques may be implemented via a multicamera system. For example, as indicated above, endpoint system 110*c* may be embodied as a video conference session endpoint arranged within a conference room that includes multiple cameras. As explained in detail below, the cameras may be assigned different roles, including a whole room scanning and seeking camera, a camera performing active speaker detection, and a camera detecting and recording visual aids, such as sticky notes, that are being actively interacted with. In order to control the multicamera system, endpoint system 110*c* includes multicamera processing unit 172 executing as part of the collaborative session software 155*c*. Multicamera processing unit 172 may control the multicamera system in order to provide the functionality of the disclosed techniques, including switching the roles of the multicamera system between the different cameras. Alternatively or in conjunction with multicamera processing unit 172, multicamera processing unit 175 of collaborative session server software 150 may also serve to control the multicamera system in order to provide the functionality of the disclosed techniques.

An artificial intelligence/machine learning (AI/ML) training model may be trained and used to control the cameras of the multicamera system. For example, the AI/ML model may be used to identify visual aids that are being held, written on, or pointed to and detect those actions as interesting events that trigger a presenter focus on that event. When it is detected that a visual aid is being interacted with (held, or if spoken content matches the text detection of the visual aid), that visual aid may appear as a picture-in-picture overlay on the video stream of the collaborative communication session. Each meeting participant, within their local collaborative communication session system, may have the ability to swap what display is the large display of the picture-in-picture (e.g., swap so the large display is the visual aid and the small display is the active speaker's face, or vice-versa). For multiple display systems (e.g., collaborative communication session endpoint systems with more than one monitor or display) instead of picture-in-picture, one of the displays may be used for the visual focus to be shown in parallel with the speaker's video of their face.

Figure 2:
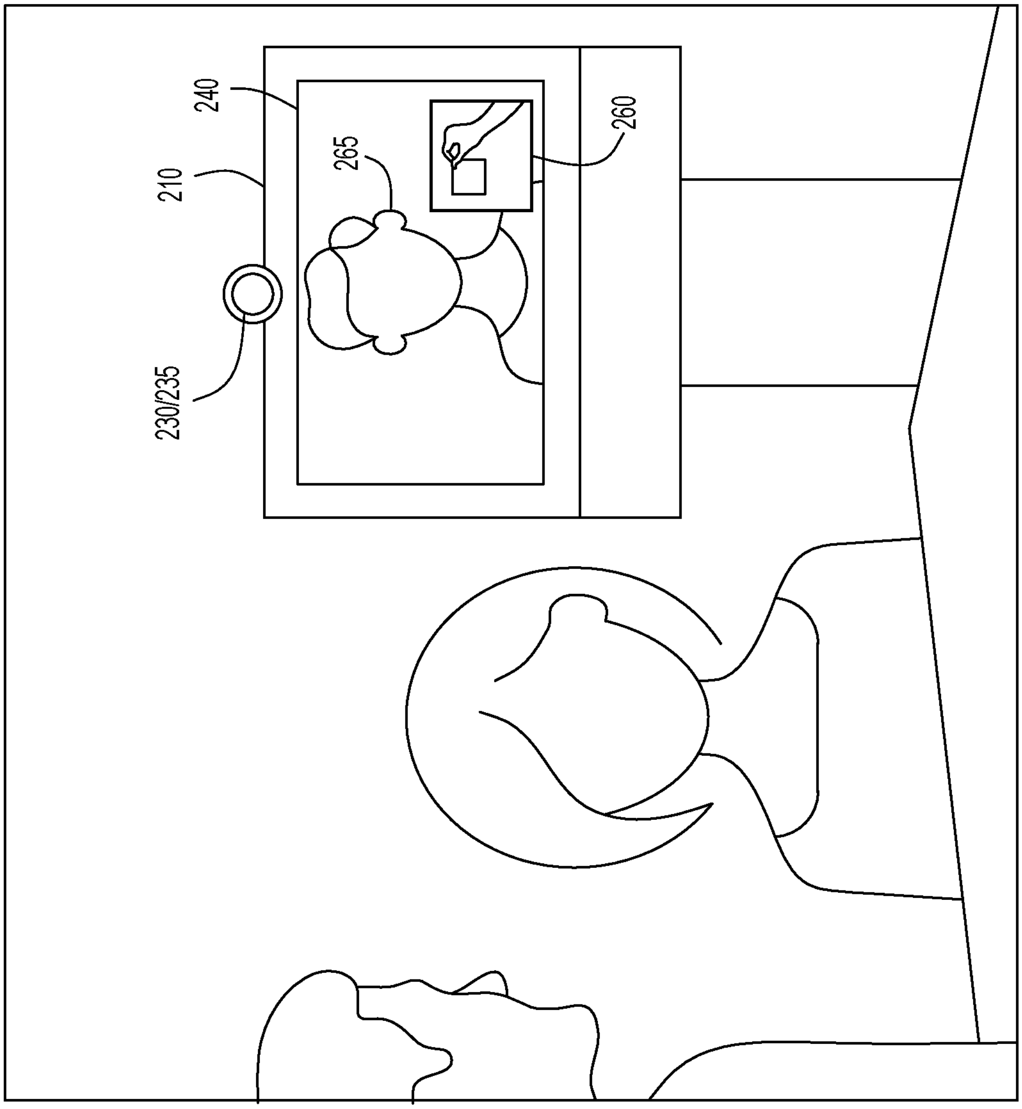
FIG. 2 is a collaborative communication session endpoint system implementing the disclosed techniques on a single display, according to an example embodiment.

Accordingly, illustrated in FIG. 2 is a collaborative communication session endpoint system 210 implementing the disclosed techniques. As shown in FIG. 2, collaborative communication session endpoint system 210 includes a camera 230, a microphone 235 and a display 240. Display 240 provides a picture-in-picture view in which a visual aid view 260 is overlaid on an active speaker view 265.

The picture-in-picture view of display 240 may be controlled by collaborative session server software, such as the multicamera processing unit 175 of collaborative session server software 150 executing on server 105 of FIG. 1. For example, endpoint system 110*c* of FIG. 1 may provide a plurality of video streams to server 105, one for each camera in a multicamera system. Accordingly, one video stream may provide a view of a particular visual aid, another video stream may provide a view of an active speaker, and a third video stream may provide a view of the conference room in which endpoint system 110*c* is located. Multicamera processing unit 175 may provide the appropriate video streams to endpoint system 210 so that the collaborative communication session software executing thereon can construct the picture-in-picture view combining visual aid view 260 with active speaker view 265. According to other examples, multicamera processing unit 175 of collaborative session server software 150 executing on server 105 may provide a single video stream to endpoint system 210 which provides the picture-in-picture view of visual aid view 260 and active speaker view 265.

According to other examples, multicamera processing unit 175 may provide the picture-in-picture view by combining an active speaker view received from a first endpoint system, such as endpoint system 110*a* of FIG. 1, with a visual aid view received from another endpoint system, such as endpoint system 110*b* of FIG. 1. In such an embodiment, the picture-in-picture display may be received at endpoint system 210 as a single video stream in which server 105 has combined the visual aid view 260 with active speaker view 265, while in other example embodiments, the visual aid view 260 and the active speaker view 265 may be provided to endpoint system 210 via separate video streams with the collaborative communication session software executing on endpoint system 210 combing the views into the picture-in-picture view.

Additionally, the disclosed techniques may also include the digitization of the visual aids presented during a collaborative communication session. Accordingly, visual aid view 260 may be provided to endpoint system 210 as a digitized version of the visual aid. According to some such examples, visual aid view 260 may be a digital or virtual view of the physical visual aid, while other examples may provide visual aid view 260 as just the digitized content of the physical visual aid.

Placement of the visual aid view 260 may also be accomplished via a split-screen view in which the visual aid view 260 is displayed concurrently with the speaker view 265 in a non-overlapping arrangement, such as via a dedicated side-panel display. Additionally, a collaborative communication session participant may be able to select or toggle between an overlapping picture-in-picture display and a non-overlapping split screen display.

Visual aid view 260 may be provided with functionality that allows collaborative communication session participants to provide feedback on the visual aid content included in the visual aid view 260. For example, visual aid view 260 may provide participants with the ability to provide a ranking for the displayed content, such as a "star" rating of one to five stars. The rankings may be used by collaborative session server software (e.g., collaborative session server software 150 of FIG. 1) to evaluate how beneficial any particular visual aid has been to the collaborative communication session. For example, in agile sprint planning sessions in which the visual aids are embodied as sticky notes, the rankings provided by the participants may be used to attribute a sticky note with an amount of story points.

Figure 3:
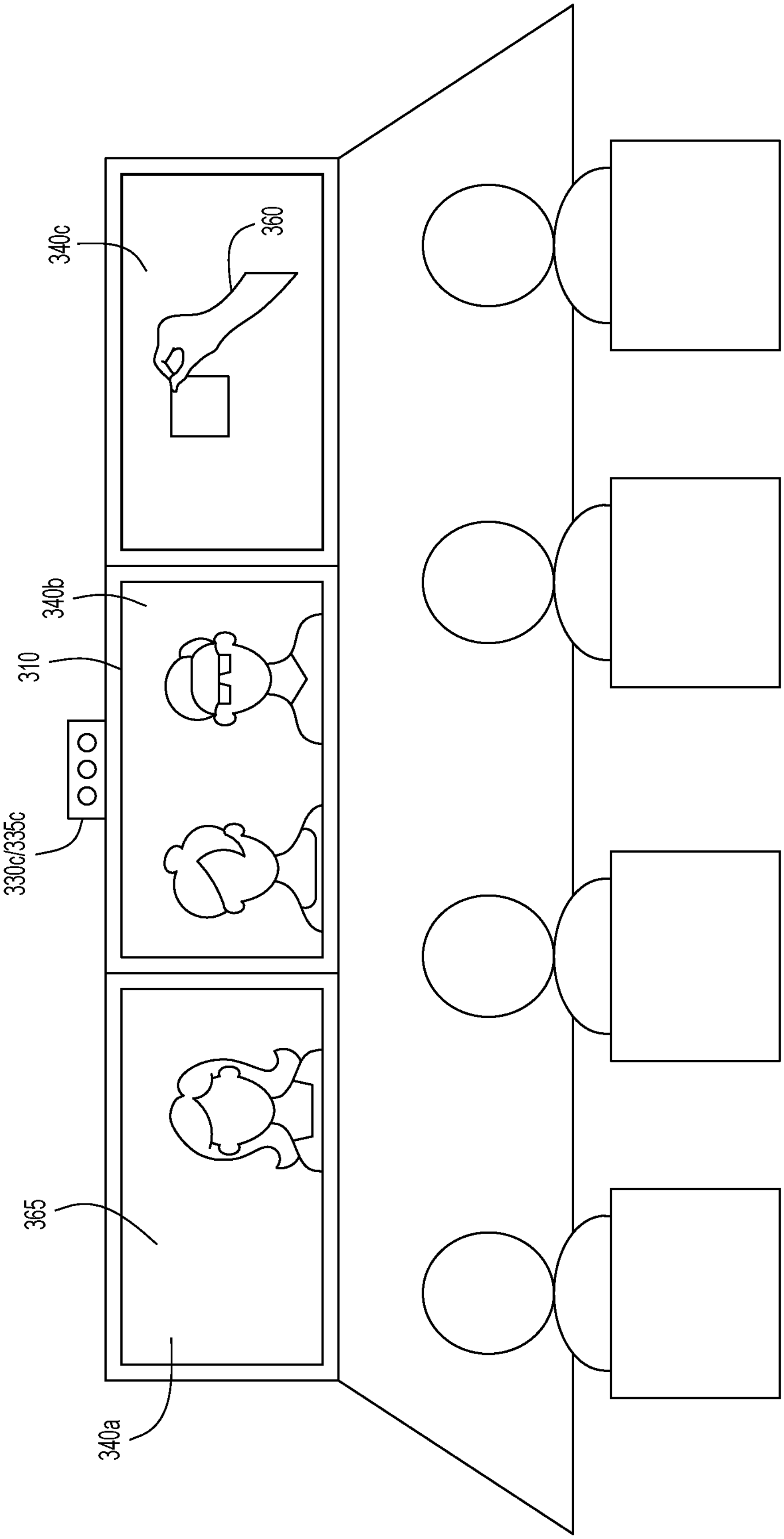
FIG. 3 is a collaborative communication session endpoint system implementing the disclosed techniques on a plurality of displays, according to an example embodiment.

Turing to FIG. 3, illustrated therein is a multi-display collaborative communication session endpoint system 310. Endpoint system 310 includes a camera 330*c*, a microphone 335*c* and three displays 340*a*, 340*b* and 340*c*. Due to the multiple displays 340*a*, 340*b*, and 340*c*, a visual aid view 360 may be provided in conjunction with an active speaker view 365 without using a picture-in-picture display as illustrated in FIG. 2. Instead, visual aid view 360 is provided on display 340*c* while active speaker view 365 is provided on display 340*a*. Like collaborative communication session endpoint system 210 of FIG. 2, the visual aid view 360 and active speaker view 365 may be provided by any number of video streams from one or more other collaborative communication session endpoint devices, with the determination of where to display which view coming from endpoint system 310 or from a server, such as server 105 of FIG. 1.

Figure 4A:
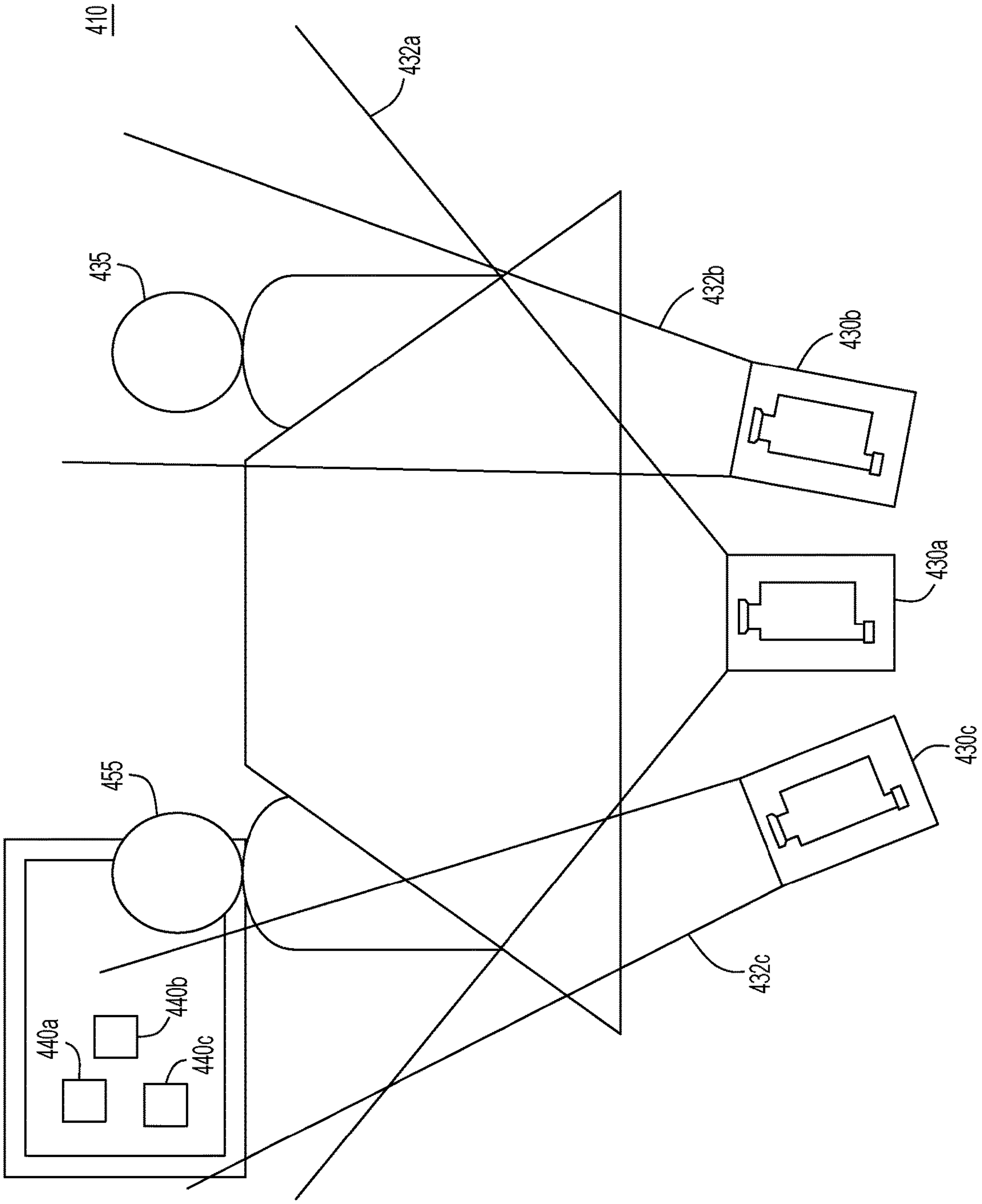
FIG. 4A is a first configuration of a multicamera collaborative communication session endpoint system implementing the disclosed techniques, according to an example embodiment.
Figure 4B:
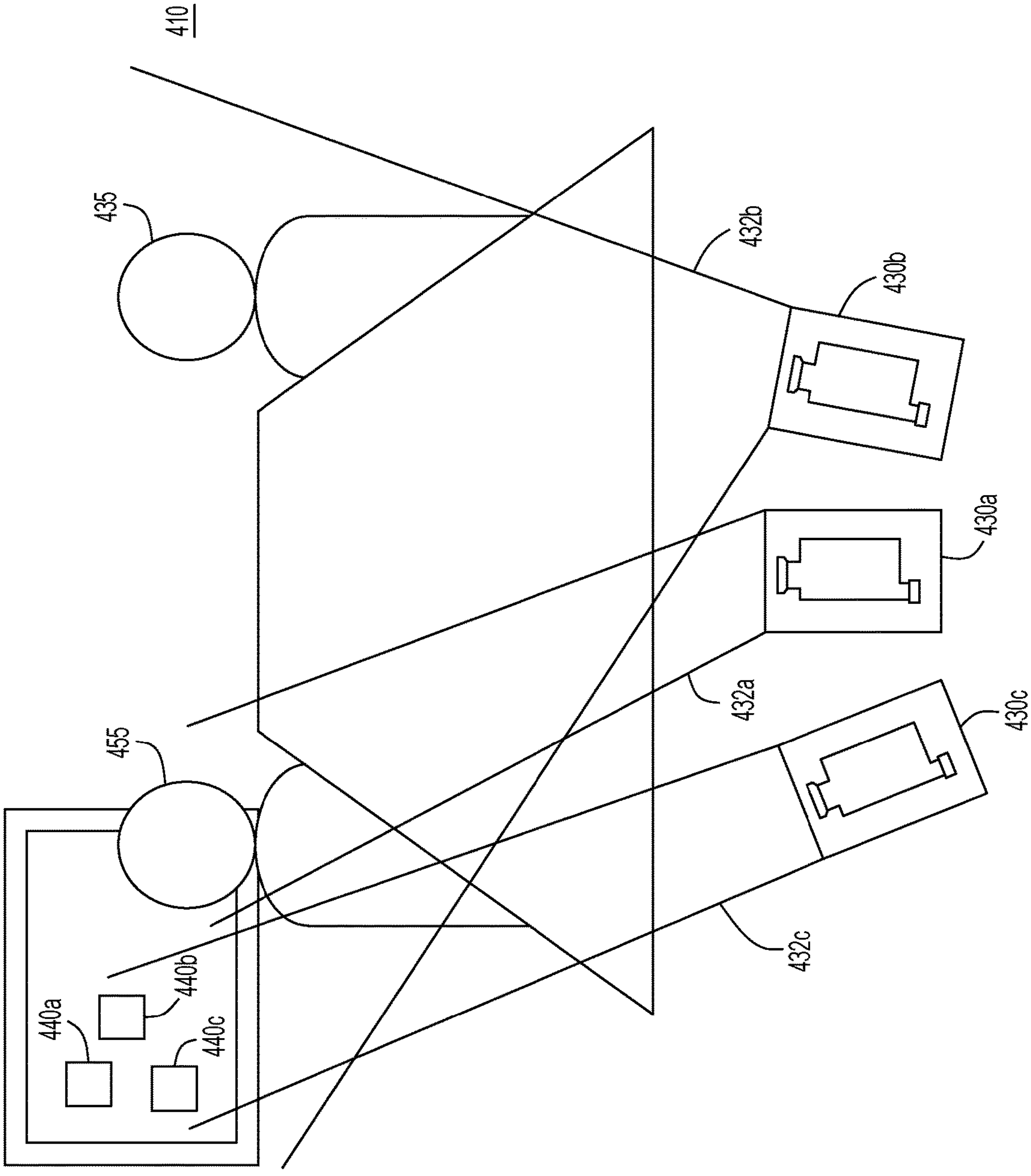
FIG. 4B is a second configuration of a multicamera collaborative communication session endpoint system implementing the disclosed techniques, according to an example embodiment.

Turning to FIGS. 4A and 4B, illustrated therein is a collaborative communication session endpoint system 410 that includes a multicamera system comprised of three cameras 430*a*, 430*b* and 430*c* (430*a*-430*c*). Endpoint system 410 may also include one or more computing devices configured to communicate over a network and executing collaborative session software, as well as one or more displays, one or more speakers and one or more microphones. In other words, system 410 may be embodied as a three-camera embodiment of endpoint system 110*c* of FIG. 1. However, only cameras 430*a*-430*c* are illustrated in FIGS. 4A and 4B According to the disclosed techniques, cameras 430*a*, 430*b* and 430*c* can switch roles based on a voting algorithm executed via collaborative session software, such as via multicamera processing unit 172 and/or multicamera processing unit 175 of FIG. 1. Specifically, the voting algorithm will select a camera for one of three roles based on, for example, which camera is in closest proximity to the intended subject. According to the disclosed techniques, a first camera, illustrated as camera 430*a* in FIG. 4A, operates as a room scanning and seeking camera, that detects visual aids, such as sticky notes, scans handwriting or other text from the visual aids to be inserted into a structured database, and identifies when to change the active visual aid video feed to focus on another visual aid. Accordingly, camera 430*a* includes a field of view 432*a* that encompasses a large portion of the conference room in which system 410 is arranged. A second camera, camera 430*b* in FIG. 4A, performs active speaker detection. Accordingly, camera 430*b* includes a field of view 432*b* that is focused on active speaker participant 435. Finally, a third camera, camera 430*c* in FIG. 4A, records visual aids, such as sticky notes, which are being actively interacted with. Accordingly, camera 430*c* includes a field of view 432*c* that is focused on one or more of sticky notes 440*a*, 440*b* or 440*c*.

When active speaker participant 435 finishes speaking, and secondary speaker participant 455 begins speaking, the voting algorithm may alter the assignments of cameras 430*a*, 430*b* and 430*c*, as illustrated in FIG. 4B. For example, based on the location of secondary speaker participant 455, the voting algorithm may determine that camera 430*a* is best suited to image secondary speaker participant 455. Accordingly, field of view 432*a* is altered from imaging the room, as illustrated in FIG. 4A, to focusing on secondary speaker participant 455. With camera 430*a* taking on the role of imaging the active speaker, the voting algorithm assigns camera 430*b* the role of imaging the room in which endpoint system 410 is arranged. Accordingly, field of 432*b* for camera 430*b* is appropriately changed to image the room.

There may be instances where a single camera would be the best camera for both the active speaker imaging role and the visual aid imaging role. For example, if such determinations are based on proximity and/or line-of-sight to the speaker and the visual aid, there may be instances where the same camera is the closest to and has the best line of sight to both the active speaker and the visual aid. In such instances, the voting algorithm may have preferences that determine whether to prioritize the active speaker or the visual aid for assignment of the best camera. For example, the visual aid view may take preference over the speaker view to ensure that the details of the visual aid are imaged with sufficient detail. According to other examples, the active speaker may be prioritized such that the speaker receives the best camera and the visual aid view is either replaced or enhanced with a digitized version of the visual aid's content. These camera selection preferences may be reinforced or altered by having collaborative communication session participants rate their experience with the camera selection algorithm during or at the end of the collaborative communication session. Other examples may reinforce or train camera detection and selection decisions by allowing participants to provide feedback each time a visual aid is mentioned and imaged during a collaborative communication session.

The switching of roles between cameras 430*a*, 430*b* and 430*c* may also be carried out in response to other considerations, such as occlusion or obstruction of a participant or visual aid. If the active speaker participant is blocked by, for example, another participant, the camera imaging the active speaker participant may be changed to another one of the cameras whose line of sight to the active speaker participant is not blocked. Similarly, if a visual aid is blocked or occluded, the camera imaging the visual aid may be changed. Similar to the discussion above, preferences may dictate whether or not a speaker or visual aid is prioritized. For example, if an active speaker is blocked, the camera imaging the visual aid may switch to imaging the active speaker if the preferences indicate that speakers are prioritized over visual aids, and vice vera.

Figure 5:
FIG. 5 illustrates a sticky note visual aid that may be used in conjunction with the disclosed multicamera visual aid display techniques, according to an example embodiment.

With reference now made to FIG. 5, depicted therein is a visual aid 505 configured to assist a multicamera system in implementing the disclosed techniques. Visual aid 505, which is embodied as a sticky note visual aid, is configured with a sticker that includes a quick response (QR) code 510. Encoded in the QR code 510 may be information that assists in the digitization and locating of the visual aid 505 by the cameras of the multicamera aspects of the disclosed techniques. For example, the data encoded in QR code 510 may indicate the collaborative session participant associated with the visual aid 505 and/or provide a unique identifier of the visual aid 505. Accordingly, QR code 510 may allow the collaborative session server software 150 of FIG. 1 to more easily digitize and keep track of which participant presented visual aid 505 in the collaborative session. QR code 510 may also allow the collaborative session server software 150 of FIG. 1 to more easily locate visual 505 among a plurality of visual aids used during a collaborative communication session. QR code 510 may also include additional metadata that may be used by collaborative session server software 150 of FIG. 1. However, QR code 510 is not the only way that collaborative session server software 150 may digitize, determine a participant to associate with visual aid 505, or locate visual aid 505. For example, the multicamera system illustrated in FIGS. 4A and 4B combined with and speech detection may be used to determine which participant presented a particular visual aid. Additionally, camera vision may be used to determine attributes of the visual aid such as the placement of the visual aid relative to other visual aids, colors of the visual aid (which may be particularly relevant for sticky note visual aids), the sequence of placement of the visual aid relative to others, and other factors such as how closely sticky note visual aids are grouped together in the hybrid collaborative communication session environment.

Once a visual aid is presented and digitized, the content of the visual aid may be extracted, digitized and structurally stored. For example, collaborative session server software 150 of FIG. 1 detects that a participant has presented a visual aid with specific content at a given time and place, camera vision (sometimes referred to as "machine vision") may be used to perform handwriting analysis to digitize the content of the visual aid. Word clustering may then be used to identify the theme and content of the text contained on the visual aid, and data associated with the content of the visual aid may be stored in a structured format for advanced analysis. The analysis of the content of the visual aid may include classifying the content into one or more categories. Based on the categories into which the content is classified, it may be determined how closely the content is related to other categories, and therefore, how closely it is related to other digitized or speech content included in the hybrid collaborative communication session.

Once the visual aid and its content has been digitized, the visual aid may be placed in a 3D synthetic environment associated with the hybrid collaborative communication sessions, such as on a virtual shared whiteboard that is incorporated into the hybrid collaborative communication session. Such a shared whiteboard and the digitized version of the visual aid may be viewed by a 3D VR or AR headset worn by a participant in the collaborative session.

Figure 6:
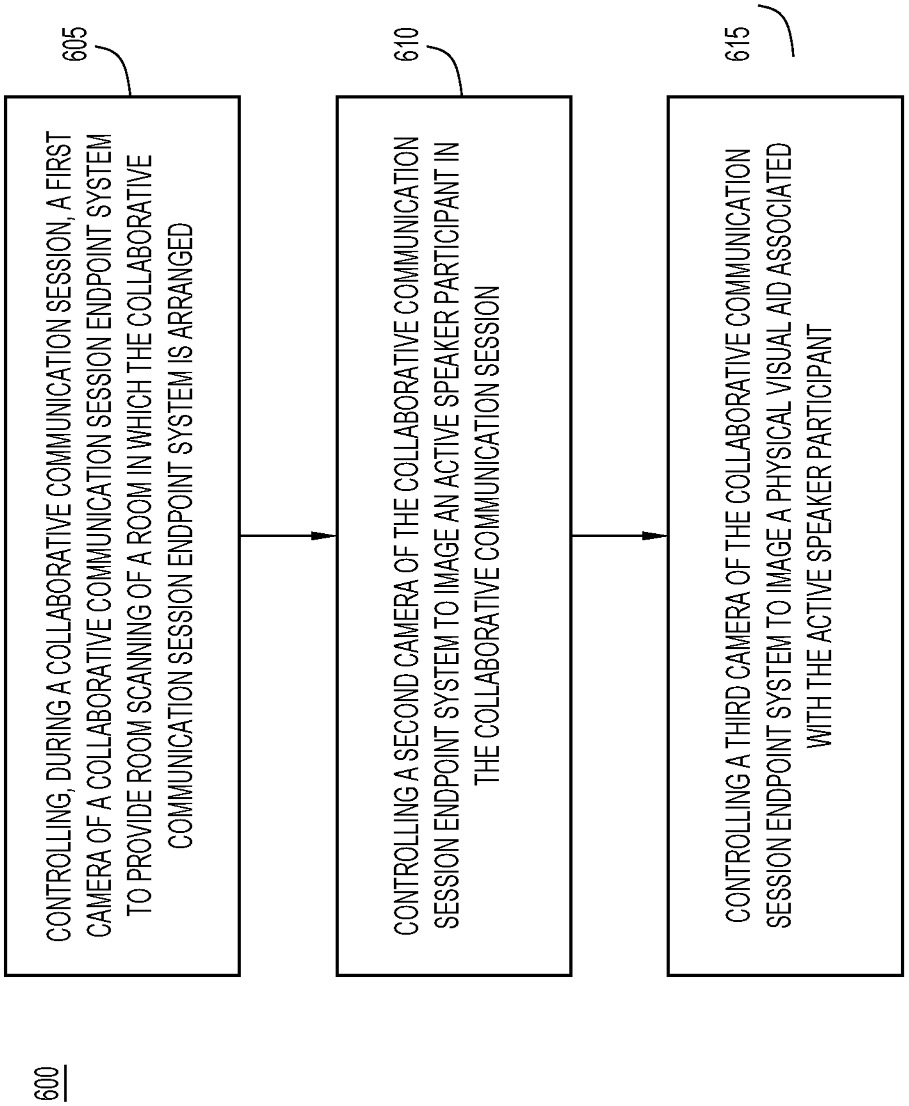
FIG. 6 is a flowchart providing a generalized process flow for controlling a multicamera system for implementing the disclosed multicamera visual aid display techniques, according to an example embodiment.

With reference now made to FIG. 6, depicted therein is a flowchart 600 providing a generalized process flow for implementing the disclosed techniques. Flowchart 600 begins in operation 605 where a first camera of a collaborative communication session endpoint system is controlled during a collaborative communication session to provide room scanning of a room in which the collaborative communication session endpoint system is arranged. Accordingly, operation 605 may include the operations described above with reference to camera 430*a* of FIG. 4A.

The room scanning of operation 605 may include the scanning and digitization of visual aids presented during the collaborative communication session. The digitization of the physical visual aids may include generating a digitized visual aid and generating data indicative of the content of the physical visual aid. For example, a participant in a hybrid collaborative communication session may present a sticky note visual aid during a hybrid collaborative communication session. The note and its content are digitized. This digitizing may include creating a digital representation of the physical visual aid, deriving and digitizing the content of the visual aid, and/or deriving and digitizing the metadata associated with the visual aid, such as determining where the visual aid is presented, its color, and its relative placement with respect to other visual aids, among other metadata.

Flowchart 600 continues in operation 610 in which a second camera of the collaborative communication session endpoint system is controlled during the collaborative communication session to image an active speaker participant in the collaborative communication session. Accordingly, operation 610 may include the operations described above with reference to camera 430*b* of FIG. 4A.

Next, flowchart 600 concludes with operation 615 in which a third camera of the collaborative communication session endpoint system is controlled during the collaborative communication session to image a physical visual aid associated with the active speaker participant. Accordingly, operation 615 may include the operations described above with reference to camera 430*c* of FIG. 4A.

Depending on the embodiment, the operations of flowchart 600 may be performed by a collaborative communication session endpoint system, such as systems 110*a*-110*c* of FIG. 1, by a collaborative communication session server, such as server 105 of FIG. 1, or through a combination of operations performed by a collaborative communication session endpoint system and a collaborative communication session server. Flowchart 600 may include more of fewer operations without deviating from the techniques disclosed herein. For example, flowchart 600 may include operations which control and change the roles of the first, second and third cameras, as described above with reference to FIGS. 4A and 4B. Furthermore, flowchart 600 may include operations that configure single display and multidisplay views of the collaborative communication session as described above with the reference to FIGS. 2 and 3 and below with reference to FIG. 7.

Figure 7:
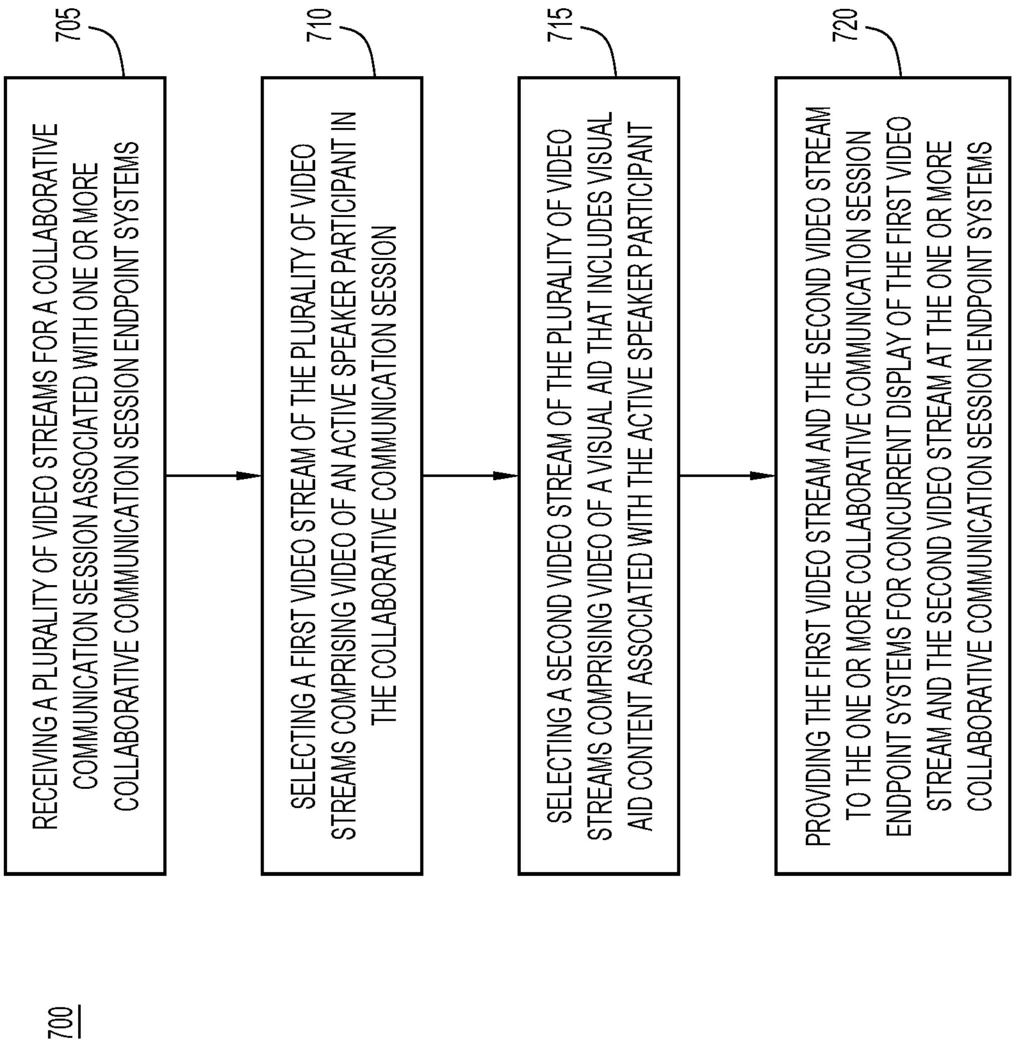
FIG. 7 is a flowchart providing a generalized process flow for providing video streams for implementing the disclosed multicamera visual aid display techniques, according to an example embodiment.

Turning to FIG. 7, depicted therein is a flowchart 700 providing a generalized process flow for generating single display and multidisplay views of the collaborative communication sessions. Accordingly, flowchart 700 may be used to carry out features of the disclosed techniques described above with reference to FIGS. 2 and 3.

Flowchart 700 begins in operation 705 where a plurality of video streams are received. The plurality of video streams are associated with one more collaborative communication session endpoint systems. Operation 705 may be embodied as the receipt of media streams from endpoint systems 110*a*-110*c* at server 105 of FIG. 1. However, operation 705 may also be embodied as a collaborative communication session endpoint system 110*a*-110*c* receiving video streams from collocated cameras 130*a*-130*c*.

Flowchart 700 continues in operation 710 where a first video stream of the plurality of video streams is selected. Specifically, the first video stream is selected to include an active speaker participant in the collaborative communication session. Operation 710 may be embodied as the use of active speaker detection performed on the first video stream via a collaborative communication session endpoint system (e.g., collaborative communication session endpoint systems 110*a*-110*c*) or via a collaborative communication session server (e.g., collaborative communication session server 105 of FIG. 1).

Next, in operation 715, a second video stream of the plurality of video streams is selected. The second video stream is selected to include video of a visual aid that includes visual aid content associated with the active speaker participant. Operation 715 may be embodied as the use of camera vision to detect the content of a visual aid, handwriting analysis to extract the content, and NLP word clustering to categorize the content. The content of the visual aid may then be matched with the content of the speech of the active speaker participant based upon the determined categories. Operation 715 may be implemented by a collaborative communication session endpoint system (e.g., collaborative communication session endpoint systems 110*a*-110*c*) or via a collaborative communication session server (e.g., collaborative communication session server 105 of FIG. 1).

Flowchart 700 concludes in operation 720 in which the first video stream and the second video stream are provided to the one or more collaborative communication session endpoint systems for concurrent display of the first video stream and the second video stream at the one or more collaborative communication session endpoint systems. Accordingly, operation 720 may be embodied as collaborative communication session endpoint systems 210 of FIG. 2 and or collaborative communication session endpoint system 310 of FIG. 3, being provided with video streams sufficient to provide for visual aid view 260/360 and active speaker participant view 265/365.

Flowchart 700 may include more of fewer operations without deviating from the techniques disclosed herein. For example, flowchart 700 may include operations as described above with reference to FIGS. 4A, 4B and 7 without deviating from the disclosed techniques.

Figure 8:
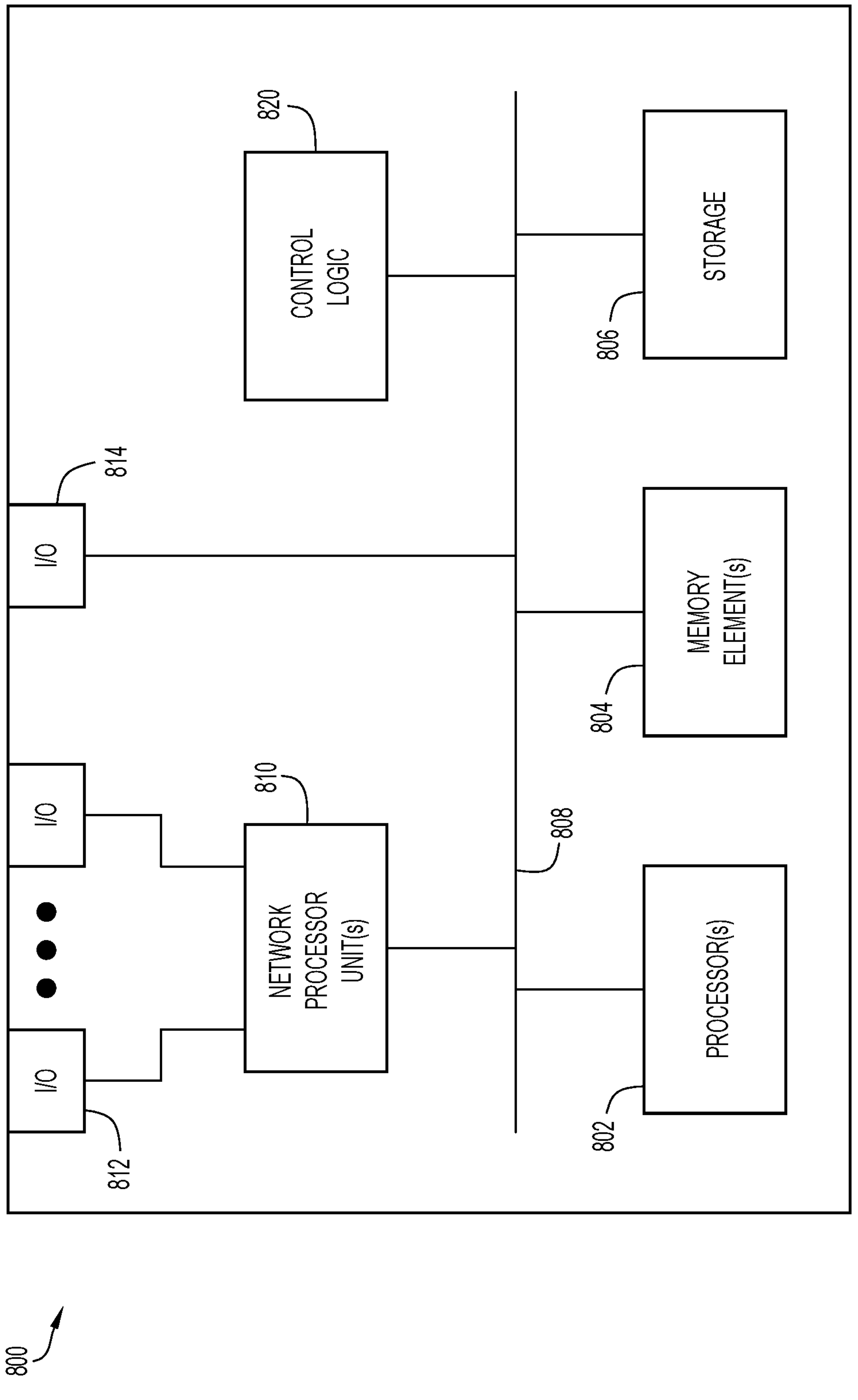
FIG. 8 is a hardware block diagram of a device configured to implement the disclosed multicamera visual aid display techniques, according to an example embodiment.

Referring to FIG. 8, FIG. 8 illustrates a hardware block diagram of a device 800 that may perform functions associated with operations discussed herein in connection with the techniques depicted in FIGS. 1-3, 4A, 4B and 5-7. The device 800 may be a computer (laptop, desktop, etc.) or other device involved in video encoding/decoding operations, including video conference equipment, SmartPhones, tablets, streaming servers, etc.

In at least one embodiment, the device 800 may be any apparatus that may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. I/O interfaces 812 and 814 may connect to the microphone, camera and display devices, including VR/AR headset described above. In various embodiments, instructions associated with logic for device 800 can overlap in any manner and are not limited to the specific allocation of instructions and/or operations described herein.

In at least one embodiment, processor(s) 802 is/are at least one hardware processor configured to execute various tasks, operations and/or functions for device 800 as described herein according to software and/or instructions configured for device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with device 800, and/or logic configured for memory element(s) 804 and/or storage 806. For example, any logic described herein (e.g., control logic 820) can, in various embodiments, be stored for device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, bus 808 can be configured as an interface that enables one or more elements of device 800 to communicate in order to exchange information and/or data. Bus 808 can be implemented with any architecture designed for passing control, data and/or information between processors, memory elements/storage, peripheral devices, and/or any other hardware and/or software components that may be configured for device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between device 800 and other systems, entities, etc., via network I/O interface(s) 812 (wired and/or wireless) to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 800 and other systems, entities, etc. to facilitate operations for various embodiments described herein. In various embodiments, network I/O interface(s) 812 can be configured as one or more Ethernet port(s), Fibre Channel ports, any other I/O port(s), and/or antenna(s)/antenna array(s) now known or hereafter developed. Thus, the network processor unit(s) 810 and/or network I/O interface(s) 812 may include suitable interfaces for receiving, transmitting, and/or otherwise communicating data and/or information in a network environment. The hardware-based packet classification solution may be integrated into one or more ASICs that form a part or an entirety of the network processor unit(s) 810.

I/O interface(s) 814 allow for input and output of data and/or information with other entities that may be connected to device 800. For example, I/O interface(s) 814 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, a VR/AR device, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X. Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In summary, provided for herein is a multi-camera system that allows for the detection of interesting content in visual aids during collaborative communication sessions, including hybrid collaborative communication session. The interesting content may be displayed via picture-in-picture (or side-panel video) overlay. Example embodiments of the disclosed systems may allow for concurrent display of an active speaker participant's video delivery content and associated visual aid video content. Such concurrent display may support enhanced engagement for hybrid workers during ideation sessions.

Accordingly, in some aspects, the techniques described herein relate to a method including: controlling, during a collaborative communication session, a first camera of a collaborative communication session endpoint system to provide room scanning of a room in which the collaborative communication session endpoint system is arranged; controlling a second camera of the collaborative communication session endpoint system to image an active speaker participant in the collaborative communication session; and controlling a third camera of the collaborative communication session endpoint system to image a physical visual aid associated with the active speaker participant.

In some aspects, the techniques described herein relate to a method wherein controlling the first camera to provide the room scanning includes controlling the first camera to: detect the physical visual aid in the room; and scan content from the physical visual aid.

In some aspects, the techniques described herein relate to a method, further including: generating a digitized visual aid based upon the content of the physical visual aid; and presenting, via a virtual reality environment or an augmented reality environment, the digitized visual aid as part of the collaborative communication session.

In some aspects, the techniques described herein relate to a method, further including: detecting a participant interaction with the physical visual aid in the room; storing data indicative of an association between a participant performing the participant interaction and the physical visual aid.

In some aspects, the techniques described herein relate to a method, further including controlling the second camera of the collaborative communication session endpoint system to image a second active speaker participant.

In some aspects, the techniques described herein relate to a method, further including controlling the third camera of the collaborative communication session endpoint system to image a second physical visual aid in response to the active speaker participant referencing the second physical visual aid, referencing a topic associated with the second physical visual aid, or gesturing to the second physical visual aid.

In some aspects, the techniques described herein relate to a method, wherein the physical visual aid includes a sticky note visual aid.

In some aspects, the techniques described herein relate to a method, wherein controlling the first camera, controlling the second camera and controlling the third camera includes controlling the first camera, controlling the second camera and controlling the third camera via a collaborative communication session server.

In some aspects, the techniques described herein relate to a method further including: receiving a first video stream from the first camera; receiving a second video stream from the second camera; receiving a third video stream from the third camera; and redistributing the first video stream, the second video stream and the third video stream to a plurality of collaborative communication session endpoint systems.

In some aspects, the techniques described herein relate to a method, wherein controlling the first camera, controlling the second camera and controlling the third camera includes controlling the first camera, controlling the second camera and controlling the third camera via the collaborative communication session endpoint systems.

In some aspects, the techniques described herein relate to a method, further including, in response to the active speaker participant being associated with a second physical visual aid or a second active speaker participant speaking during the collaborative communication session, switching operation of the first camera from providing room scanning of the room to imaging the active speaker participant, imaging the second active speaker participant or imaging the second physical visual aid.

In some aspects, the techniques described herein relate to a method including: receiving a plurality of video streams for a collaborative communication session associated with one or more collaborative communication session endpoint systems; selecting a first video stream of the plurality of video streams including video of an active speaker participant in the collaborative communication session; selecting a second video stream of the plurality of video streams including video of a visual aid that includes visual aid content associated with the active speaker participant; and providing the first video stream and the second video stream to the one or more collaborative communication session endpoint systems for concurrent display of the first video stream and the second video stream at the one or more collaborative communication session endpoint systems.

In some aspects, the techniques described herein relate to a method, wherein selecting the second video stream includes: determining from the first video stream a category of speech content in speech of the active speaker participant; determining, based on a third video stream of the plurality of video streams, a category of the visual aid content; and selecting the second video stream by matching the category of the speech content with the category of the visual aid content.

In some aspects, the techniques described herein relate to a method, further including receiving the first video stream, the second video stream and the third video stream from a same collaborative communication session endpoint system of the one or more collaborative communication session endpoint systems.

In some aspects, the techniques described herein relate to a method, wherein providing the first video stream and the second video stream to the one or more of the collaborative communication session endpoint systems includes providing a fourth video stream in which content over the second video stream is overlaid on content of the first video stream.

In some aspects, the techniques described herein relate to a method, wherein selecting the second video stream of the plurality of video streams includes selecting the second video stream at a collaborative communication session endpoint system collocated with the active speaker participant.

In some aspects, the techniques described herein relate to a method, wherein the selecting the second video stream of the plurality of video streams includes selecting the second video stream at a collaborative communication session server that communicates with a collaborative communication session endpoint system collocated with the active speaker participant via a network.

In some aspects, the techniques described herein relate to an apparatus including: a plurality of cameras of a collaborative communication session endpoint system, a network interface configured to communicate over a network; and one or more processors configured to perform operations including: controlling, during a collaborative communication session, a first camera of the plurality of cameras to provide room scanning of a room in which the collaborative communication session endpoint system is arranged; controlling a second camera of the plurality of cameras to image an active speaker participant in the collaborative communication session; and controlling a third camera of the plurality of cameras to image a physical visual aid associated with the active speaker participant.

In some aspects, the techniques described herein relate to an apparatus, wherein the one or more processors are configured perform the operations on behalf of the collaborative communication session endpoint system.

In some aspects, the techniques described herein relate to an apparatus, wherein the one or more processors are configured perform the operations on behalf of a collaborative communication session server, and wherein the operations further include receiving a first video stream from the first camera, a second video stream from the second camera, and a third video stream from the third camera from the collaborative communication session endpoint system via the network.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:

controlling, during a collaborative communication session, a first camera of a collaborative communication session endpoint system to provide room scanning of a room in which the collaborative communication session endpoint system is arranged;

determining, based on a first video stream associated with the first camera, a category of visual aid content associated with a physical visual aid in the room;

controlling a second camera of the collaborative communication session endpoint system to image an active speaker participant in the collaborative communication session;

detecting, based on a second video stream associated with the second camera, speech that includes words being spoken by the active speaker participant;

determining, based on the words being spoken by the active speaker participant, a category of speech content in the speech of the active speaker participant;

matching the category of the speech content with the category of the visual aid content;

determining, based on matching the category of the speech content with the category of the visual aid content, that the active speaker participant is discussing the physical visual aid;

controlling, in response to determining that the active speaker participant is discussing the physical visual aid, a third camera of the collaborative communication session endpoint system to image the physical visual aid; and digitizing content of the physical visual aid to generate a digitized visual aid for display on devices of participants of the collaborative communication session.

2. The method of claim 1 wherein controlling the first camera to provide the room scanning comprises controlling the first camera to:

detect the physical visual aid in the room; and scan content from the physical visual aid.

3. The method of claim 2, further comprising:

presenting, via a virtual reality environment or an augmented reality environment, the digitized visual aid as part of the collaborative communication session.

4. The method of claim 2, further comprising:

detecting a participant interaction with the physical visual aid in the room; and storing data indicative of an association between a participant performing the participant interaction and the physical visual aid.

5. The method of claim 1, further comprising controlling the second camera of the collaborative communication session endpoint system to image a second active speaker participant.

6. The method of claim 1, further comprising controlling the third camera of the collaborative communication session endpoint system to image a second physical visual aid in response to the active speaker participant referencing the second physical visual aid, referencing a topic associated with the second physical visual aid, or gesturing to the second physical visual aid.

7. The method of claim 1, wherein the physical visual aid comprises a sticky note visual aid.

8. The method of claim 1, wherein controlling the first camera, controlling the second camera and controlling the third camera comprises controlling the first camera, controlling the second camera and controlling the third camera via a collaborative communication session server.

9. The method of claim 7 further comprising:

receiving the first video stream from the first camera;

receiving the second video stream from the second camera;

receiving a third video stream from the third camera; and redistributing the first video stream, the second video stream and the third video stream to a plurality of collaborative communication session endpoint systems.

10. The method of claim 1, wherein controlling the first camera, controlling the second camera and controlling the third camera comprises controlling the first camera, controlling the second camera and controlling the third camera via the collaborative communication session endpoint system.

11. The method of claim 1, further comprising, in response to the active speaker participant being associated with a second physical visual aid or a second active speaker participant speaking during the collaborative communication session, switching operation of the first camera from providing room scanning of the room to imaging the active speaker participant, imaging the second active speaker participant or imaging the second physical visual aid.

12. A method comprising:

receiving a plurality of video streams for a collaborative communication session associated with one or more collaborative communication session endpoint systems, the plurality of video streams including a first video stream, a second video stream, and a third video stream;

selecting the first video stream of the plurality of video streams comprising video of an active speaker participant in the collaborative communication session;

detecting, from the first video stream, speech that includes words spoken by the active speaker participant;

determining, based on the words spoken by the active speaker participant, a category of speech content in the speech of the active speaker participant;

determining, based on the third video stream of the plurality of video streams, a category of visual aid content associated with a visual aid;

matching the category of the speech content with the category of the visual aid content;

determining, based on matching the category of the speech content with the category of the visual aid content, that the active speaker participant is discussing the visual aid;

selecting, in response to determining that the active speaker participant is discussing the visual aid, the second video stream of the plurality of video streams comprising video of the visual aid that includes the visual aid content;

digitizing the visual aid content to generate digitized visual aid content; and providing the first video stream and the second video stream with the digitized visual aid content to the one or more collaborative communication session endpoint systems for concurrent display of the first video stream and the second video stream at the one or more collaborative communication session endpoint systems.

13. The method of claim 12, further comprising receiving the first video stream, the second video stream and the third video stream from a same collaborative communication session endpoint system of the one or more collaborative communication session endpoint systems.

14. The method of claim 12, wherein providing the first video stream and the second video stream to the one or more collaborative communication session endpoint systems comprises providing a fourth video stream in which content of the second video stream is overlaid on content of the first video stream.

15. The method of claim 12, wherein selecting the second video stream of the plurality of video streams comprises selecting the second video stream at a collaborative communication session endpoint system collocated with the active speaker participant.

16. The method of claim 12, wherein selecting the second video stream of the plurality of video streams comprises selecting the second video stream at a collaborative communication session server that communicates with a collaborative communication session endpoint system collocated with the active speaker participant via a network.

17. An apparatus comprising:

a plurality of cameras of a collaborative communication session endpoint system, a network interface configured to communicate over a network; and one or more processors configured to perform operations comprising:

controlling, during a collaborative communication session, a first camera of the plurality of cameras to provide room scanning of a room in which the collaborative communication session endpoint system is arranged;

determining, based on a first video stream associated with the first camera, a category of visual aid content associated with a physical visual aid in the room;

controlling a second camera of the plurality of cameras to image an active speaker participant in the collaborative communication session;

detecting, from a second video stream associated with the second camera, speech that includes words being spoken by the active speaker participant;

determining, from the words being spoken by the active speaker participant, a category of speech content in the speech of the active speaker participant;

matching the category of the speech content with the category of the visual aid content;

determining, based on matching the category of the speech content with the category of the visual aid content, that the active speaker participant is discussing a physical visual aid;

controlling, based on determining that the active speaker participant is discussing the physical visual aid, a third camera of the plurality of cameras to image the physical visual aid; and digitizing content of the physical visual aid to generate a digitized visual aid for display on devices of participants of the collaborative communication session.

18. The apparatus of claim 17, wherein the one or more processors are configured to perform the operations on behalf of the collaborative communication session endpoint system.

19. The apparatus of claim 17, wherein the one or more processors are configured to perform the operations on behalf of a collaborative communication session server, and wherein the operations further comprise receiving a first video stream from the first camera, a second video stream from the second camera, and a third video stream from the third camera from the collaborative communication session endpoint system via the network.

20. The method of claim 12, further comprising redistributing the first video stream, the second video stream and the third video stream to a plurality of collaborative communication session endpoint systems.

* * * * *